(12) United States Patent
Yang et al.

(10) Patent No.: US 12,008,820 B2
(45) Date of Patent: Jun. 11, 2024

(54) METHOD AND APPARATUS OF MATCHING LANE LINE DATA, DEVICE AND STORAGE MEDIUM

(71) Applicant: BEIJING BAIDU NETCOM SCIENCE TECHNOLOGY CO., LTD., Beijing (CN)

(72) Inventors: Pengbin Yang, Beijing (CN); Yang Yang, Beijing (CN); Jianxu Zhang, Beijing (CN); Wenlong Chen, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 403 days.

(21) Appl. No.: 17/351,832

(22) Filed: Jun. 18, 2021

(65) Prior Publication Data

US 2021/0312194 A1    Oct. 7, 2021

(30) Foreign Application Priority Data

Dec. 15, 2020    (CN) .......................... 202011476137.6

(51) Int. Cl.
*G06V 20/56* (2022.01)
*G05D 1/00* (2006.01)

(52) U.S. Cl.
CPC ......... *G06V 20/588* (2022.01); *G05D 1/0088* (2013.01); *G05D 1/0094* (2013.01); *G05D 1/0246* (2013.01); *G06V 2201/07* (2022.01)

(58) Field of Classification Search
CPC ............. G06V 20/588; G06V 2201/07; G05D 1/0088; G05D 1/0094; G05D 1/0246;
(Continued)

(56) References Cited

U.S. PATENT DOCUMENTS 7,876,926 B2    1/2011  Schwartz et al.
10,740,645 B2 *  8/2020  Ozog .................. G06V 20/588
(Continued)

FOREIGN PATENT DOCUMENTS

CN    110595490    12/2019
CN    111046709    4/2020
(Continued)

OTHER PUBLICATIONS

Office Action issued in corresponding Chinese Patent Application No. 202011476137.6, dated Apr. 11, 2023.

*Primary Examiner* — Wesley J Tucker
(74) *Attorney, Agent, or Firm* — Pillsbury Winthrop Shaw Pittman, LLP (57) ABSTRACT

The present disclosure provides a method of matching lane line data, which relates to a field of automatic driving, and in particular to a field of locating an autonomous vehicle. The method of matching lane line data includes: obtaining a first data indicating sensed lane lines and a second data indicating map lane lines respectively; constructing a correlation weight matrix for the first data and the second data, based on differences between the sensed lane lines and the map lane lines; and matching the first data with the second data according to the correlation weight matrix, so as to obtain a third data having an optimal match with the first data from the second data. The present disclosure further discloses an apparatus of matching lane line data, a device, a storage medium and a computer program product.

20 Claims, 6 Drawing Sheets

(58) Field of Classification Search
CPC ............ B60W 30/12; B60W 2420/42; B60W 2552/53; B60W 2556/40; G06F 18/22
See application file for complete search history.

(56) References Cited

U.S. PATENT DOCUMENTS

| | | | |
|---|---|---|---|
| 11,657,625 B2* | 5/2023 | Marcotte | G06V 10/82 382/104 |
| 11,760,349 B2* | 9/2023 | Chen | B60W 50/0098 701/26 |
| 2015/0175161 A1* | 6/2015 | Breed | B60W 50/14 348/148 |
| 2020/0005068 A1* | 1/2020 | Ozog | G06T 7/74 |
| 2020/0193177 A1* | 6/2020 | Kozonek | G06V 10/82 |
| 2020/0386557 A1* | 12/2020 | Hansson | G01C 21/30 |
| 2020/0393265 A1* | 12/2020 | Piao | G01C 21/3815 |
| 2021/0407130 A1* | 12/2021 | Qian | G06V 20/588 |
| 2022/0237402 A1* | 7/2022 | Unnikrishnan | G06N 3/045 |
| 2023/0043236 A1* | 2/2023 | Zhang | G01S 19/53 |
| 2023/0215190 A1* | 7/2023 | Rezaei | G06V 20/588 382/181 |

FOREIGN PATENT DOCUMENTS

| | | |
|---|---|---|
| CN | 111220164 | 6/2020 |
| CN | 111998860 | 11/2020 |
| CN | 112001456 | 11/2020 |
| EP | 1918853 | 5/2008 |
| EP | 3748300 | 12/2020 |
| WO | 2020232648 | 11/2020 |

* cited by examiner

METHOD AND APPARATUS OF MATCHING LANE LINE DATA, DEVICE AND STORAGE MEDIUM

This application claims priority to the Chinese Patent Application No. 202011476137.6, filed on Dec. 15, 2020, which is incorporated herein in its entirety by reference.

TECHNICAL FIELD

The present disclosure relates to a field of automatic driving, in particular to a field of locating an autonomous vehicle, and more specifically to a method and apparatus of matching lane line data, a device, a storage medium and a computer program product.

BACKGROUND

An accurate locating of a vehicle is a premise of automatic driving. A sensor such as a camera installed on an autonomous vehicle may be used to capture images for a driving vehicle, so that lane line data may be obtained by processing the images. The obtained lane line data may be matched with map lane line data obtained from a high-precision map to locate the autonomous vehicle.

SUMMARY

According to the embodiments of the present disclosure, a method and apparatus of matching lane line data, a device, a storage medium and a computer program product are provided.

According to an aspect of the embodiments of the present disclosure, there is provided a method of matching lane line data, the method including:
  obtaining a first data indicating sensed lane lines and a second data indicating map lane lines respectively;
  constructing a correlation weight matrix for the first data and the second data, based on differences between the sensed lane lines and the map lane lines; and
  matching the first data with the second data according to the correlation weight matrix, so as to obtain a third data having an optimal match with the first data from the second data.

According to an aspect of the embodiments of the present disclosure, there is provided an apparatus of matching lane line data, the apparatus including:
  an obtaining module, configured to obtain a first data indicating sensed lane lines and a second data indicating map lane lines respectively;
  a correlation weight matrix constructing module, configured to construct a correlation weight matrix for the first data and the second data, based on differences between the sensed lane lines and the map lane lines; and
  a matching module, configured to match the first data with the second data according to the correlation weight matrix, so as to obtain a third data having an optimal match with the first data from the second data.

According to an aspect of the embodiments of the present disclosure, there is provided an electronic device, including:
  at least one processor; and
  a memory communicatively connected to the at least one processor,
  wherein the memory stores instructions executable by the at least one processor, and the instructions, when executed by the at least one processor, cause the at least one processor to implement the method according to an aspect of the embodiments of the present disclosure.

According to an aspect of the embodiments of the present disclosure, there is provided a non-transitory computer-readable storage medium having computer instructions stored therein, wherein the computer instructions allows a computer to implement the method according to an aspect of the embodiments of the present disclosure.

According to an aspect of the embodiments of the present disclosure, there is provided a computer program product, including computer programs, and the computer programs, when executed by a processor, implement the method according to an aspect of the embodiments of the present disclosure.

It should be understood that the content described in this part is not intended to identify key or important features of the embodiments of the present disclosure, and it is not intended to limit the scope of the present disclosure. Other features of the present disclosure may become easily understood according to the following description.

BRIEF DESCRIPTION OF THE ACCOMPANYING DRAWINGS

The drawings are used to better understand the solution and do not constitute a limitation to the present disclosure, in which.

DETAILED DESCRIPTION

The exemplary embodiments of the present disclosure are described below with reference to the drawings, which include various details of the embodiments of the present disclosure to facilitate understanding, and which should be considered as merely illustrative. Therefore, those ordinary skilled in the art should realize that various changes and modifications may be made to the embodiments described herein without departing from the scope and spirit of the present disclosure. In addition, for clarity and conciseness, descriptions of well-known functions and structures are omitted in the following description.

Figure 1:
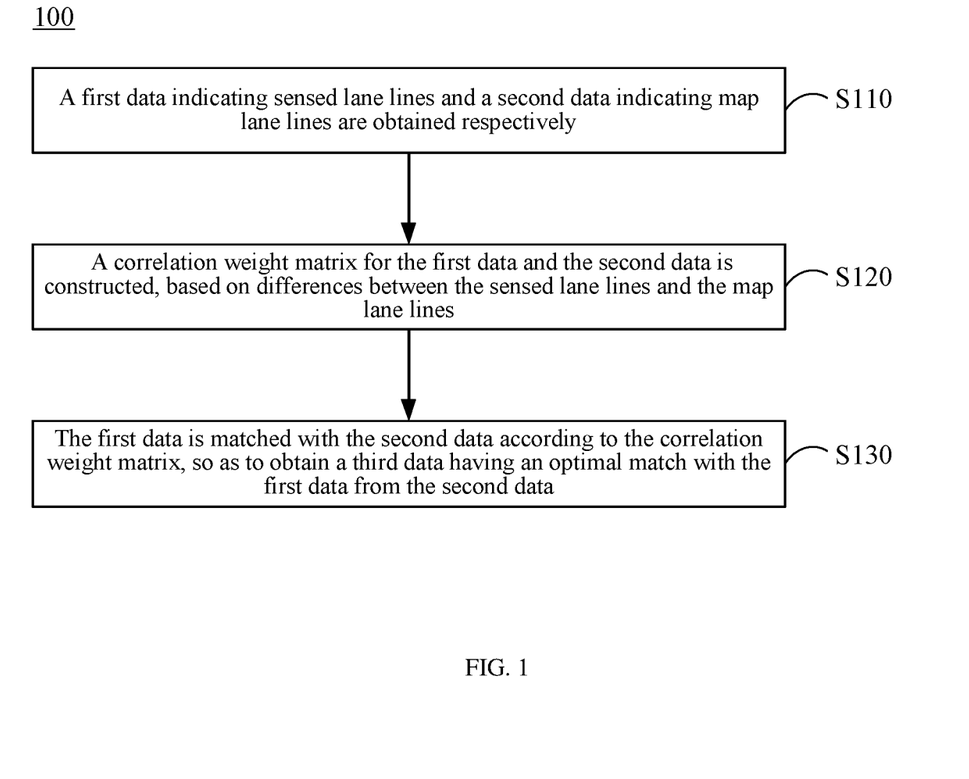
FIG. 1 shows a flowchart of a method of matching lane line data according to some embodiments of the present disclosure.

FIG. 1 shows a flowchart of a method 100 of matching lane line data according to some embodiments of the present disclosure. As shown in FIG. 1, the method 100 of matching lane line data includes at least one or more of the following operations.

In operation S110, a first data indicating sensed lane lines and a second data indicating map lane lines are obtained, respectively.

In operation S120, a correlation weight matrix for the first data and the second data is constructed, based on differences between the sensed lane lines and the map lane lines.

In operation S130, the first data is matched with the second data according to the correlation weight matrix, so as to obtain a third data having an optimal match with the first data from the second data.

Specifically, in operation S110, the first data indicating the sensed lane lines may be obtained by performing recognition processing on an image acquired by a camera. In this way, all sensed lane line data (the first data) in the camera field of view may be obtained, and the detection result often depends on actual scenes. In the actual scenes, there may be interferences due to old and new lane lines, braking marks, asphalt, etc., which may be mistakenly identified as the lane lines. In addition, the second data indicating the map lane lines may be obtained by reading data from a high-precision map stored in advance.

Then, in operation S120, the correlation weight matrix for the first data and the second data may be constructed, based on the differences between the sensed lane lines and the map lane lines. In the embodiments of the present disclosure, the differences between the sensed lane lines and the map lane lines include at least one selected from: differences in horizontal intercept between the sensed lane lines and the map lane lines, differences in relative yaw angle between the sensed lane lines and the map lane lines and/or control point offsets between the sensed lane lines and the map lane lines. It is obvious that the differences between the sensed lane lines and the map lane lines above are only examples, and that other differences may be used alternatively or in addition according to causes of a sensing error or false detection. For example, differences other than the above differences may be added based on properties of a sensor such as a camera or based on interferences of actual road conditions.

According to a technical solution of the embodiments of the present disclosure, the correlation weight matrix for the first data indicating the sensed lane lines and the second data indicating the map lane lines may be expanded. For example, there may be a false detection in the sensed lane line data, such as a false detection due to old and new lanes or road cracks on the road surface, or a false detection due to current road problems (for example, a temporary road construction), resulting in an increase of data dimensions for associating the sensed lane line data with the map lane line. In this situation, only weights added newly are calculated when determining the correlation weight matrix.

Next, in operation S130, the first data is matched with the second data according to the correlation weight matrix, and a global assignment and an optimal data match for the sensed lane line data and the map lane line data in global may be performed by using the correlation weight matrix. Therefore, according to embodiments of the present disclosure, it is possible to effectively reduce the interference of a misdetected lane line to the match, and to avoid an assignment conflict between detected lane lines and the map lane lines in the match process. Thus, an accuracy of data match may be increased.

According to the embodiments, after obtaining the sensed lane line data and the map lane line data, and before constructing the correlation weight matrix for the sensed lane line data and the map lane line data based on the differences between the sensed lane lines and the map lane lines, the obtained sensed lane line data may be preprocessed. According to some embodiments, a set of sensed lane lines may be selected according to horizontal intercepts of the sensed lane lines on a horizontal axis in a vehicle body coordinate system and yaw angles of the sensed lane lines relative to the horizontal axis in the vehicle body coordinate system, so as to obtain a candidate sensed lane line set. Thus, the correlation weight matrix for the sensed lane line data and the map lane line data may be constructed based on the preprocessed candidate sensed lane line set. In this way, some of the interfering sensed lane lines may be removed and a calculation amount may be reduced.

Figure 2:
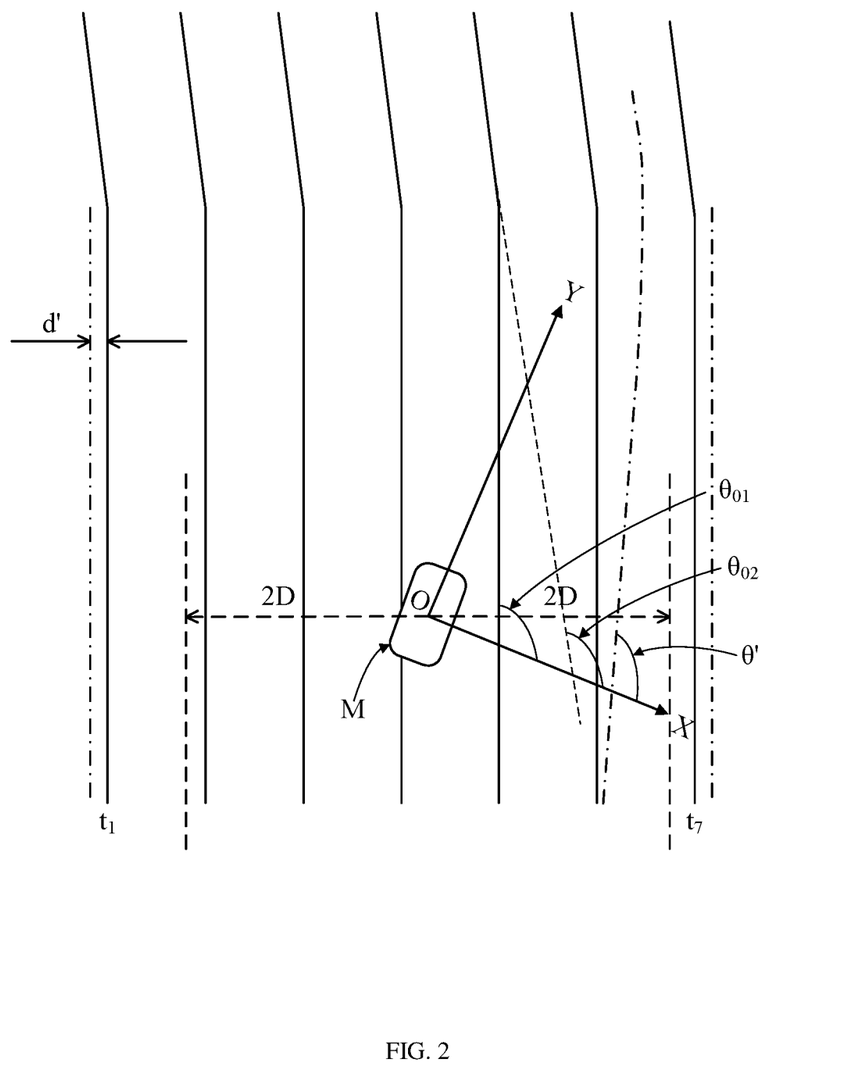
FIG. 2 shows a schematic diagram of preprocessing sensed lane line data according to some embodiments of the present disclosure.

FIG. 2 shows a schematic diagram of preprocessing sensed lane line data according to some embodiments of the present disclosure. As shown in FIG. 2, for example, M represents an autonomous vehicle, and a coordinate system XOY represents the vehicle body coordinate system located at the vehicle M. In the coordinate system XOY, a positive direction of the Y-axis is a driving direction of the vehicle, and a positive direction of the X-axis (the horizontal axis in the vehicle body coordinate system) is a direction of a 90-degree clockwise rotation from the positive direction of the Y-axis. In the description of the embodiments of the present disclosure, locating is carried out with reference to the vehicle body coordinate system. In FIG. 2, solid lines represent the map lane lines determined according to the high-precision map, dot dash lines represent the sensed lane lines or sensed boundary lines obtained from the sensed image, and dotted lines represent auxiliary indication lines.

As shown in FIG. 2, the image for obtaining the sensed lane lines is captured by a camera installed on the vehicle M. Limited by properties of the camera, errors of the image data will be relatively large at edges and far sides in the captured image. Therefore, in embodiments of the present disclosure, the processing is only carried out for sensed lane lines within a certain horizontal intercept of the vehicle M in a left direction and a right direction. For example, only lane lines within two standard lane widths (such as 7.5 m) are processed, as indicated by "2D" in FIG. 2. Sensed lane lines beyond the two standard lane widths are not processed. This is not only beneficial to reduce a search space of a problem, but also beneficial to reduce the calculation amount. It should be noted that other preprocessing ranges, such as 1.5 standard lane widths or 3 standard lane widths, may be set, which is not limited by the embodiments of the present disclosure.

In embodiments of the present disclosure, the sensed lane lines may further be filtered according to the relative yaw angles (included angles with the horizontal axis (i.e. the X-axis) in the vehicle body coordinate system) at 0 m of the vehicle. As increasing the distance from the vehicle, the detection error for the lane lines may increase, and it is possible to detect other vehicles as the lane lines at a far side from the vehicle and connect the detected vehicles with lane lines detected near the vehicle, resulting in the obtained lane lines being completely incorrect. If this kind of lane lines is mismatched, the error of the relative yaw angle may increase rapidly. In the embodiments of the present disclosure, the map lane lines are taken as a reference to calculate a relative yaw angle range of the map lane lines. As shown in FIG. 2, an angle between a map lane line and the positive direction of the X-axis is shown as $\theta_{01}$. Since the lane is not necessarily a straight line, the included angle between the map lane line and the positive direction of the X-axis changes within a range. As shown in FIG. 2, $\theta_{02}$ is an angle between a non-straight map lane line and the positive direction of the X-axis. Therefore, the angle between the map lane line and the positive direction of the X-axis is in a range of [$\theta_{o1}$, $\theta_{o2}$]. According to the embodiments, the [$\theta_{o1}$, $\theta_{o2}$] is regarded as a credible reference of the relative yaw angle range to filter out the sensed lane line data. For example, according to the embodiments, it is possible to add ±2° to the range above as a confidence interval, so that lane lines outside the confidence interval are excluded and not being matched.

By filtering the sensed lane lines based on the horizontal intercepts and the relative yaw angles of the sensed lane lines, the search space and the calculation amount may be reduced.

Furthermore, in the embodiments of the present disclosure, after obtaining the sensed lane line data and the map lane line data, and before constructing the correlation weight matrix for the sensed lane line data and the map lane line data based on the differences between the sensed lane lines and the map lane lines, a following operation may be performed. If it is determined that the obtained sensed lane lines include the sensed boundary lines, the sensed boundary lines may be corrected for determining whether the sensed boundary lines may be used in subsequent matching operations or not. According to embodiments, a distance between the sensed boundary lines may be compared with a predetermined boundary distance. The predetermined boundary distance may be a relative width between two boundaries stored in the high-precision map. According to embodiments, if an absolute value of a difference between the distance between the sensed boundary lines and the predetermined boundary distance is smaller than or equal to a first threshold, the sensed boundary lines are modified to outermost sensed lane lines. If the absolute value of the difference between the distance between the sensed boundary lines and the predetermined boundary distance is greater than the first threshold, the sensed boundary lines are discarded.

The left and right boundaries may be completely detected from the sensed lane lines. As shown in FIG. 2, the dot dash line on the left side of the map lane line $t_1$ and the dot dash line on the right side of the map lane line $t_7$ are two boundaries detected on both sides. In this situation, the distance between the two dot dash lines is verified according to the relative width between the two boundaries stored in the high-precision map. If the distance is within a range set for the relative width, then the two dot dash lines are considered as the sensed boundary lines, that is, the verification is passed. Next, a distance between a boundary and a lane line nearest to the boundary (i.e., the outermost lane line) is determined according to the high-precision map. Then, the sensed boundary lines are moved based on the distance, so that the sensed boundary lines are moved to the positions of the outermost lane lines. As shown in FIG. 2, the distance between the boundary determined according to the high-precision map and the outermost lane line is represented by d'. The dot dash line on the left side of $t_1$ may be translated to the right by the distance d' and the dot dash line on the right side of the map lane line $t_7$ may be translated to the left by the distance d'. In this way, the two sensed boundary lines may be used as the outermost lane lines in the subsequent lane line matching.

According to embodiments, a first difference matrix may be determined based on differences in horizontal intercept between the sensed lane lines and the map lane lines, a second difference matrix may be determined based on differences in relative yaw angle between the sensed lane lines and the map lane lines, a third difference matrix may be determined based on control point offsets between the sensed lane lines and the map lane lines, and the correlation weight matrix for the first data and the second data may be constructed according to the first difference matrix, the second difference matrix and the third difference matrix.

Figure 3:
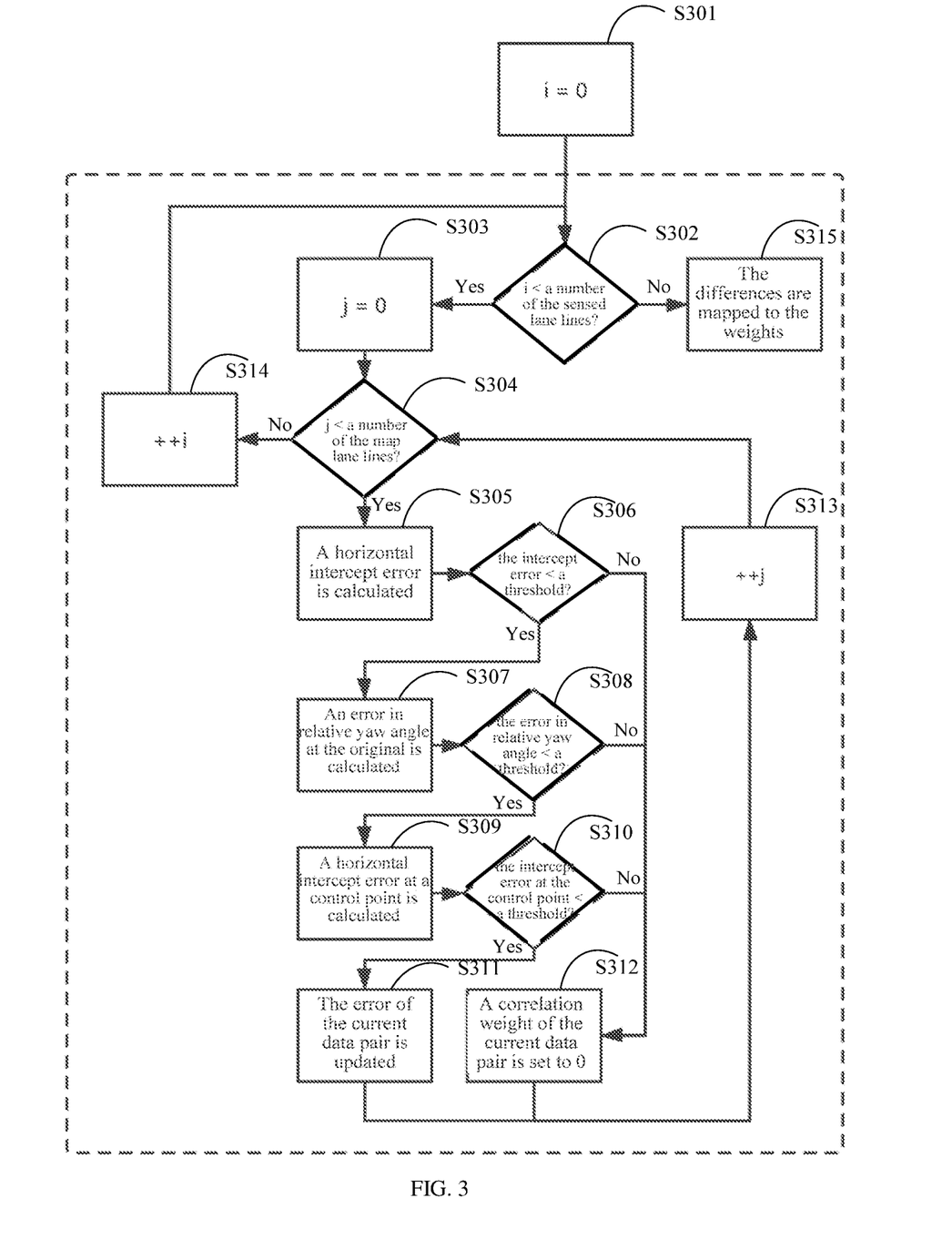
FIG. 3 shows a schematic flowchart of constructing a correlation weight matrix according to some embodiments of the present disclosure.

FIG. 3 shows a schematic flowchart of constructing a correlation weight matrix according to some embodiments of the present disclosure, and the process of constructing the correlation weight matrix is described in combination with FIG. 3.

As shown in FIG. 3, variables i and j are set, i is a variable for querying the sensed lane lines, and j is a variable for querying the map lane lines. As shown in FIG. 3, in operation S301, the variable i is set to 0. In operation S302, a determination is performed on the value of i, so that whether i is smaller than a number of the sensed lane lines or not may be determined. If it is determined that i is smaller than the number of the sensed lane lines, then operation S303 is performed. In operation S303, the variable j is set to 0. Next, in operation S304, a determination is performed on the value of j, so that whether j is smaller than a number of the map lane lines or not may be determined. If it is determined that j is smaller than the number of the map lane lines, then operation S305 is performed. In operation S305, the difference (error) in horizontal intercept between the sensed lane line and the map lane line is calculated. Next, in operation S306, it is determined whether the difference in horizontal intercept between the sensed lane line and the map lane line is smaller than a set threshold (the first threshold) or not. If it is determined that the difference in horizontal intercept between the sensed lane line and the map lane line is smaller than the set threshold, operation S307 is performed. In operation S307, the difference in relative yaw angle at the origin between the sensed lane line and the map lane line is calculated. If it is determined that the difference in horizontal intercept between the sensed lane line and the map lane line is not smaller than the set threshold, then operation S312 is performed. In operation S312, it is considered that a correlation weight between the sensed lane line and the map lane line is 0. By determining whether the difference in horizontal intercept between the sensed lane line and the map lane line is smaller than the set first threshold or not, only matched pairs whose difference in horizontal intercept between the sensed lane line and the map lane line is smaller than the set first threshold may be retained. If the difference in horizontal intercept between the sensed lane line and the map lane line is greater than or equal to the first threshold, it is considered that there is a low possibility of matching the sensed lane line and the map lane line. Therefore, if the correlation weight between the sensed lane line and the map lane line is 0, other operations (such as the calculation of the relative yaw angle) may not be performed on the sensed lane line and the map lane line, so as to reduce the calculation amount.

After calculating the difference in relative yaw angle at the origin between the sensed lane line and the map lane line, it is determined whether the difference in relative yaw angle is smaller than a set threshold (a second threshold) or not in operation S308. If it is determined that the difference in relative yaw angle is smaller than the second threshold, operation S309 is performed. In operation S309, the control point offset (a horizontal intercept error at a control point) between the sensed lane line and the map lane line is calculated. If it is determined that the difference in relative yaw angle is not smaller than the second threshold, then operation S312 is performed. In operation S312, it is considered that the correlation weight between the sensed lane line and the map lane line is 0. By determining whether the difference in relative yaw angle between the sensed lane line and the map lane line is smaller than the set second threshold or not, only matched pairs whose difference in relative yaw angle between the sensed lane line and the map lane line is smaller than the set second threshold may be retained. If the difference in relative yaw angle between the sensed lane line and the map lane line is greater than or equal to the first threshold, it is considered that there is a low possibility of matching the sensed lane line and the map lane line. Therefore, if the correlation weight between the sensed lane line and the map lane line is 0, other operations (such as the calculation of the control point offset) may not be performed on the sensed lane line and the map lane line, so as to reduce the calculation amount.

After calculating the control point offset between the sensed lane line and the map lane line, it is determined whether the control point offset is smaller than a set threshold (a third threshold) or not in operation S310. If it is determined that the control point offset is smaller than the third threshold, operation S311 is performed. In operation S311, the difference of a current matched pair of the sensed lane line and the map lane line is updated. If it is determined that the control point offset is not smaller than the third threshold, then operation S312 is performed. In operation S312, it is considered that the correlation weight between the sensed lane line and the map lane line is 0.

After completing the match query of the j-th map lane line for the i-th sensed lane line, the variable j is adjusted to j+1 in operation S313. A match of the (j+1)-th map lane line for the i-th sensed lane line is examined repeatedly according to the above operations. After completing matching queries of all candidate map lane lines for the i-th sensed lane line, the variable i is adjusted to i+1 in operation S314. Matches of the candidate map lane lines for the (i+1)-th sensed lane line are examined repeatedly according to the above operations. After completing the matching query of the candidate map lane lines for all the sensed lane lines, the differences are mapped to the weights in operation S315.

Figure 4:
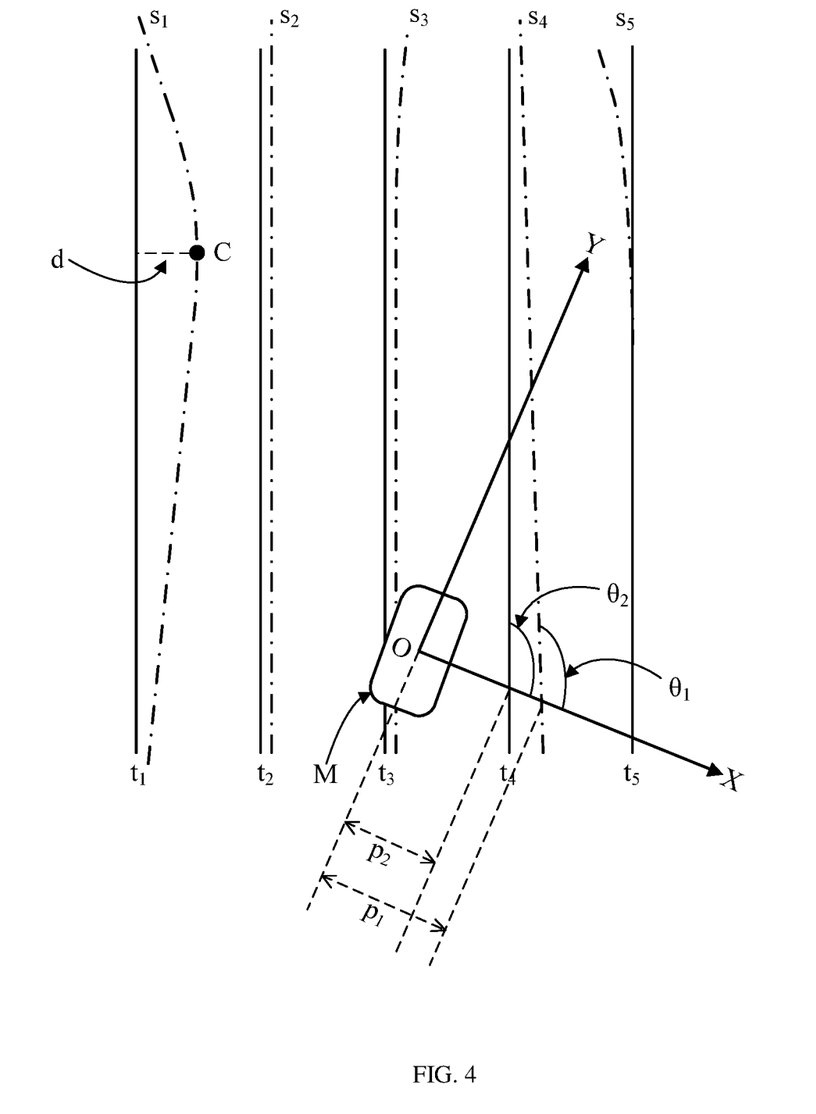
FIG. 4 shows a schematic diagram of differences between sensed lane lines and map lane lines according to some embodiments of the present disclosure.

FIG. 4 shows a schematic diagram of differences between sensed lane lines and map lane lines according to some embodiments of the present disclosure. With reference to FIG. 4, calculating processes are described for determining the first difference matrix based on the differences in horizontal intercept between the sensed lane lines and the map lane lines, determining the second difference matrix based on the differences in relative yaw angle between the sensed lane lines and the map lane lines, and determining the third difference matrix based on the control point offsets between the sensed lane lines and the map lane lines.

According to embodiments, the determining the first difference matrix based on the differences in horizontal intercept between the sensed lane lines and the map lane lines includes at least one or more of the following operations. A first intercept of each of the sensed lane lines on the horizontal axis in the vehicle body coordinate system is obtained. A second intercept of each of the map lane lines on the horizontal axis in the vehicle body coordinate system is obtained. The first difference matrix is determined, according to absolute values of differences between the first intercept of each sensed lane line and the second intercept of each map lane line.

As shown in FIG. 4, $t_1$, $t_2$, $t_3$, $t_4$ and $t_5$ are shown as the map lane lines, and $s_1$, $s_2$, $s_3$, $s_4$ and $s_5$ are shown as the sensed lane lines. The first intercept of the sensed lane line $s_4$ on the X-axis in the vehicle body coordinate system XOY is $p_1$, and the second intercept of the map lane line $t_4$ on the X-axis in the vehicle body coordinate system XOY is $p_2$. When calculating the first difference of the matched pair between the sensed lane line $s_4$ and the map lane line $t_4$, the first difference is determined by $|p_1-p_2|$, and the calculated first difference is a value in the first difference matrix. Other first differences of the matched pairs between the sensed lane lines and the map lane lines may be determined according to the calculation method above. For example, the first difference of the matched pair between the sensed lane line $s_3$ and the map lane line $t_3$ may be determined according to the calculation method above.

According to embodiments, the determining the second difference matrix based on the differences in relative yaw angle between the sensed lane lines and the map lane lines includes at least one or more of the following operations. A first yaw angle of each of the sensed lane lines relative to the horizontal axis in the vehicle body coordinate system is obtained. A second yaw angle of each of the map lane lines relative to the horizontal axis in the vehicle body coordinate system is obtained. The second difference matrix is determined, according to absolute values of differences between the first yaw angle of each sensed lane line and the second yaw angle of each map lane line.

As shown in FIG. 4, the first yaw angle of the sensed lane line $s_4$ relative to the X-axis in the vehicle body coordinate system XOY is $\theta_1$, and the second yaw angle of the map lane line $t_4$ relative to the X-axis in the vehicle body coordinate system XOY is $\theta_2$. When calculating the second difference of the matched pair between the sensed lane line $s_4$ and the map lane line $t_4$, the second difference is determined by $|\theta_1-\theta_2|$, and the calculated second difference is a value in the second difference matrix. Other second differences of the matched pairs between the sensed lane lines and the map lane lines may be determined according to the calculation method above. For example, the second difference of the matched pair between the sensed lane line $s_3$ and the map lane line $t_3$ may be determined according to the calculation method above.

According to embodiments, the determining the third difference matrix based on the control point offsets between the sensed lane lines and the map lane lines includes at some of the following operations. At least one control point on each of the sensed lane lines is selected. Distances from the control point on each of the sensed lane lines to each of the map lane lines are determined. The determined distances are set as the control point offsets. The third difference matrix is determined, according to the control point offsets.

The sensed lane line conforms to a curvilinear equation. In order to control a deviation degree from the sensed lane line to the map lane line, a point on the sensed lane line is selected within a certain distance in front of the vehicle. The nearest distance from the point to its candidate map lane lines is calculated. Thus the deviation degree from the sensed lane line to the map lane line may be measured. In specific embodiments, a point on the sensed lane line which is 8 meters in front of the vehicle may be selected as the control point of the sensed lane line. As shown in FIG. 4, C is the selected control point on the sensed lane line $s_1$, d is the distance from the control point C to the map lane line $t_1$ nearest to the sensed lane line $s_1$, and the distance is regarded as the control point offset.

Furthermore, according to embodiments, the high-precision map is stored in a form of longitude and latitude points; there is no analytic equation form. Therefore, to reduce the calculation amount, in the embodiments of the present disclosure, the nearest distance is calculated based on a discrete version of a golden section method. A point-to-segment distance function is adopted, as shown in expression (1) as follows.

$$d = \begin{cases} |\overrightarrow{AC}| & r \leq 0 \\ |\overrightarrow{BC}| & r \geq 1 \\ |\overrightarrow{CD}| & \text{otherwise} \end{cases} \quad (1)$$

wherein $$r = \frac{\overrightarrow{AC} \cdot \overrightarrow{AB}}{|\overrightarrow{AB}|^2}.$$

Figure 5A:
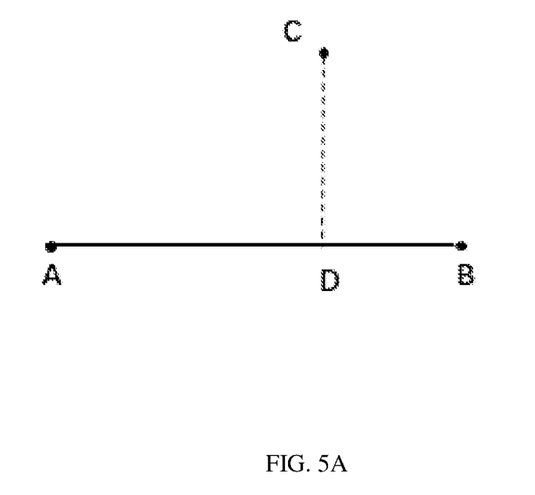
FIG. 5A and FIG. 5B show schematic diagrams of determining a control point offset according to some embodiments of the present disclosure.
Figure 5B:
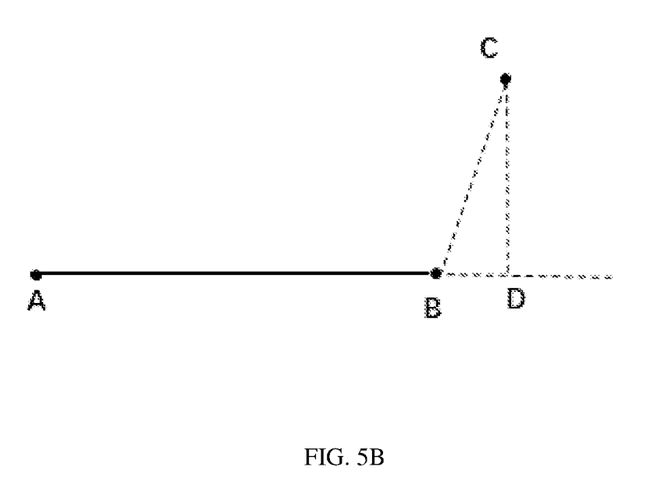

FIGS. 5A and 5B show schematic diagrams of determining a control point offset according to some embodiments of the present disclosure. A line perpendicular to the segment AB is generated through the control point C. If a foot point is within the segment AB, as shown in FIG. 5A, then the distance $d=|\overrightarrow{CD}|$. Otherwise, as shown in FIG. 5B, d is a distance between C and the nearest end of the segment, that is, $|\overrightarrow{AC}|$ or $|\overrightarrow{BC}|$.

According to embodiments, the constructing the correlation weight matrix for the first data and the second data, according to the first difference matrix, the second difference matrix and the third difference matrix includes at least one or more of the following operations. A sensed lane line set is constructed according to the sensed lane lines related to the first difference matrix, the second difference matrix and the third difference matrix, and a map lane line set is constructed according to the map lane lines related to the first difference matrix, the second difference matrix and the third difference matrix. Correlation weights between each sensed lane line in the sensed lane line set and each map lane line in the map lane line set are determined, according to the first difference matrix, the second difference matrix and the third difference matrix. The correlation weight matrix for the first data and the second data is constructed, according to the correlation weights between each sensed lane line in the sensed lane line set and each map lane line in the map lane line set.

According to embodiments, the first difference matrix, the second difference matrix and the third difference matrix store the values of the first differences, the second differences and the third differences of the matched pairs between each sensed lane line and each map lane line, respectively. According to the preceding embodiments, the map lane lines matched with the sensed lane lines are filtered when determining the first difference matrix, and the map lane lines matched with the sensed lane lines are filtered again when determining the second difference matrix. Therefore, the numbers of matched pairs between the sensed lane lines and the map lane lines related to each difference matrix are different from each other. According to embodiments, the sensed lane line set and the map lane line set are constructed according to the sensed lane lines and the map lane lines jointly related to the first difference matrix, the second difference matrix and the third difference matrix. Then, normalized differences between each sensed lane line in the sensed lane line set and each map lane line in the map lane line set are determined, respectively.

In embodiments of the present disclosure, the first difference, the second difference and the third difference belong to different orders, which cannot be added or subtracted directly. The relative yaw angle (second difference) is quite different from the control point offset (third difference). Therefore, the data of the three dimensions should be normalized to eliminate the influence of the different orders. According to embodiments, the normalized j-th difference of the i-th matched pair of the sensed lane lines and the map lane lines is determined based on expression (2) as follows.

$$\text{error\_norm}_{i,j} = \frac{\text{error}_{i,j}}{\sum_i \text{error}_{i,j}} \quad (2)$$

wherein, $\text{error\_norm}_{i,j}$ is the normalized j-th difference of the i-th matched pair of the sensed lane lines and the map lane lines, i and j are natural numbers, $1 \leq i \leq m*n$, $1 \leq j \leq 3$, m is a number of the sensed lane lines in the sensed lane line set, n is a number of the map lane lines in the map lane line set, and $\text{error}_{i,j}$ is the j-th difference of the i-th matched pair of the sensed lane lines and the map lane lines.

Then, the correlation weights between each sensed lane line and each map lane line is determined based on expression (3) as follows.

$$\text{weight}_i = c_i * \Sigma_j (1 - \text{error\_norm}_{i,j}) \quad (3)$$

wherein, $\text{weight}_i$ is a correlation weight of an i-th matched pair of the sensed lane lines and the map lane lines, and $c_i$ is a correction coefficient determined according to a position of the sensed lane lines.

According to embodiments, the correction coefficient $c_i$ is related to an attribute and the horizontal intercept of the sensed lane line itself in the i-th matched pair. According to embodiments, if the sensed lane line in the i-th matched pair is the sensed boundary line, then $c_i=0.95$. If the horizontal intercept of the sensed lane line in the i-th matched pair is greater than one standard lane width (3.75 m), then $c_i=0.9$. If the sensed lane line is the sensed boundary line and the horizontal intercept of the sensed lane line is greater than 3.75 m, then $c_i=0.95*0.9$. If the horizontal intercept of the sensed lane line is within 3.75 m, then $c_i=1$. Based on this setting of the correction coefficient, the calculation tends to use the nearer non-boundary lane lines for data matching.

In embodiments of the present disclosure, the correlation weights between each sensed lane line and each map lane line may be determined according to the correlation weight matrix, that is, the sensed lane line data may be matched with the map lane line data according to the correlation weight matrix, including at least one or more of the following operations. Matched pairs having a highest correlation weight value are determined for each of the sensed lane lines respectively from matched pairs related to said each of the sensed lane lines, according to the correlation weight matrix. If map lane lines related to the matched pairs having the highest correlation weight value are different from each other, then the matched pairs having the highest correlation weight value are set for each of the sensed lane lines respectively as a match between the first data and the second data. If the same map lane lines exist in the matched pairs having the highest correlation weight value, then an optimal match between the sensed lane lines and the map lane lines for the correlation weight matrix is determined based on a maximum matching set of a weighted bipartite graph, and the optimal match is set as the match between the first data and the second data. According to embodiments of the present disclosure, if there is no assignment conflict in the matched pair of the sensed lane lines and the map lane lines, the matched pairs having the largest correlation weights may be selected directly. If there is an assignment conflict between the sensed lane lines and the map lane lines, the global optimal match may be obtained based on the maximum matching set of the weighted bipartite graph.

Figure 6:
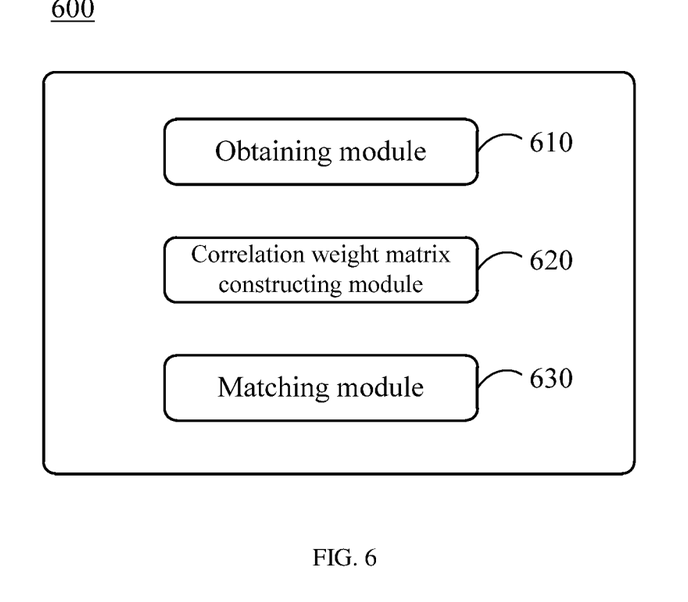
FIG. 6 shows a block diagram of an apparatus of matching lane line data according to some embodiments of the present disclosure.

FIG. 6 shows a block diagram of an apparatus 600 of matching lane line data according to some embodiments of the present disclosure. As shown in FIG. 6, the apparatus 600 of matching lane line data includes an obtaining module 610, a correlation weight matrix constructing module 620, and a matching module 630.

According to embodiments, the obtaining module 610 is used to obtain a first data indicating sensed lane lines and a second data indicating map lane lines, respectively. The correlation weight matrix constructing module 620 is used to construct a correlation weight matrix for the first data and the second data, based on differences between the sensed lane lines and the map lane lines. The matching module 630 is used to match the first data with the second data according to the correlation weight matrix, so as to obtain a third data having an optimal match with the first data from the second data.

For specific operations of the functional modules above, reference may be made to the operations of the method 100 of matching lane line data in the embodiments described above, which will not be repeated here.

According to embodiments of the present disclosure, the present disclosure further provides an electronic device and a readable storage medium.

Figure 7:
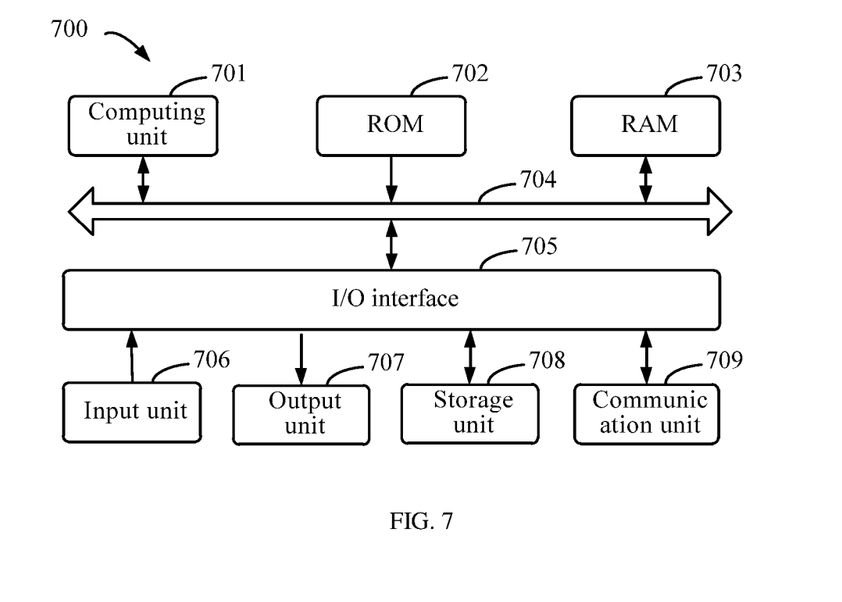
FIG. 7 shows a block diagram of an electronic device of implementing a method of matching lane line data according to some embodiments of the present disclosure.

FIG. 7 shows a block diagram of an electronic device of implementing a method of matching lane line data according to some embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 7, the electronic device may include one or more processors 701, a memory 702, and interface(s) for connecting various components, including high-speed interface(s) and low-speed interface(s). The various components are connected to each other by using different buses, and may be installed on a common motherboard or installed in other manners as required. The processor may process instructions executed in the electronic device, including instructions stored in or on the memory to display graphical information of GUI (Graphical User Interface) on an external input/output device (such as a display device coupled to an interface). In other embodiments, a plurality of processors and/or a plurality of buses may be used with a plurality of memories, if necessary. Similarly, a plurality of electronic devices may be connected in such a manner that each device provides a part of necessary operations (for example, as a server array, a group of blade servers, or a multi-processor system). In FIG. 7, a processor 701 is illustrated by way of example.

The memory 702 is a non-transitory computer-readable storage medium provided by the present disclosure. The memory stores instructions executable by at least one processor, to cause the at least one processor to perform the method of matching lane line data in the present disclosure. The non-transitory computer-readable storage medium of the present disclosure stores computer instructions for allowing a computer to execute the method of matching lane line data in the present disclosure.

The memory 702, as a non-transitory computer-readable storage medium, may be used to store non-transitory software programs, non-transitory computer-executable programs and modules, such as program instructions/modules corresponding to the method of matching lane line data in the embodiments of the present disclosure (for example, the obtaining module 610, the correlation weight matrix constructing module 620, and the matching module 630 shown in FIG. 6). The processor 701 executes various functional applications and data processing of the server by executing the non-transient software programs, instructions and modules stored in the memory 702, thereby implementing the method of matching lane line data in the embodiments of the method mentioned above.

The memory 702 may include a program storage area and a data storage area. The program storage area may store an operating system and an application program required by at least one function. The data storage area may store data etc. generated by using the electronic device according to the method of matching lane line data. In addition, the memory 702 may include a high-speed random access memory, and may further include a non-transitory memory, such as at least one magnetic disk storage device, a flash memory device, or other non-transitory solid-state storage devices. In some embodiments, the memory 702 may optionally include a memory provided remotely with respect to the processor 701, and such remote memory may be connected through a network to the electronic device of matching lane line data. Examples of the above-mentioned network include, but are not limited to, the Internet, intranet, local area network, mobile communication network, and combination thereof.

The electronic device of matching lane line data may further include an input device 703 and an output device 704. The processor 701, the memory 702, the input device 703 and the output device 704 may be connected by a bus or in other manners. In FIG. 7, the connection by a bus is illustrated by way of example.

The input device 703 may receive input information of numbers or character, and generate key input signals related to user settings and function control of the electronic device of matching lane line data, such as a touch screen, a keypad, a mouse, a track pad, a touchpad, a pointing stick, one or more mouse buttons, a trackball, a joystick, and so on. The output device 704 may include a display device, an auxiliary lighting device (for example, a LED), a tactile feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in a digital electronic circuit system, an integrated circuit system, an application specific integrated circuit (ASIC), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may transmit the data and instructions to the storage system, the at least one input device, and the at least one output device.

These computing programs (also referred to as programs, software, software applications, or codes) contain machine instructions for a programmable processor, and may be implemented using high-level programming languages, object-oriented programming languages, and/or assembly/machine languages. As used herein, the terms "machine-readable medium" and "computer-readable medium" refer to any computer program product, apparatus and/or device (for example, magnetic disk, optical disk, memory, programmable logic device (PLD)) for providing machine instructions and/or data to a programmable processor, including a machine-readable medium for receiving machine instructions as machine-readable signals. The term "machine-readable signal" refers to any signal for providing machine instructions and/or data to a programmable processor.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may further be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the systems and technologies described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN) and Internet.

The computer system may include a client and a server. The client and the server are generally far away from each other and usually interact through a communication network. The relationship between the client and the server is generated through computer programs running on the corresponding computers and having a client-server relationship with each other.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

In an embodiment, there is provided a vehicle or automobile comprising an apparatus, an electronic device and/or a readable storage medium as described herein.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

We claim:

1. A method of matching lane line data, the method comprising:
   obtaining a first data indicating sensed lane lines and a second data indicating map lane lines respectively;
   constructing a correlation weight matrix for the first data and the second data, based on differences between the sensed lane lines and the map lane lines, the constructing the correlation weight matrix comprising:
      determining, based on differences in horizontal intercept between the sensed lane lines and the map lane lines, a first difference matrix,
      determining, based on differences in relative yaw angle between the sensed lane lines and the map lane lines, a second difference matrix,
      determining, based on control point offsets between the sensed lane lines and the map lane lines, a third difference matrix, and
      constructing, according to the first difference matrix, the second difference matrix and the third difference matrix, the correlation weight matrix for the first data and the second data; and
   matching the first data with the second data according to the correlation weight matrix, so as to obtain a third data having an optimal match with the first data from the second data.

2. The method of claim 1, wherein the determining a first difference matrix comprises:
   obtaining a first intercept of each of the sensed lane lines on a horizontal axis in a vehicle body coordinate system;
   obtaining a second intercept of each of the map lane lines on the horizontal axis in the vehicle body coordinate system; and
   determining the first difference matrix, according to absolute values of differences between the first intercept of each sensed lane line and the second intercept of each map lane line.

3. The method of claim 1, wherein the determining a second difference matrix comprises:
   obtaining a first yaw angle of each of the sensed lane lines relative to a horizontal axis in a vehicle body coordinate system;
   obtaining a second yaw angle of each of the map lane lines relative to the horizontal axis in the vehicle body coordinate system; and
   determining the second difference matrix, according to absolute values of differences between the first yaw angle of each sensed lane line and the second yaw angle of each map lane line.

4. The method of claim 1, wherein the determining a third difference matrix comprises:
   selecting at least one control point on each of the sensed lane lines;
   determining distances from the control point on each of the sensed lane lines to each of the map lane lines, and setting the determined distances as control point offsets; and
   determining the third difference matrix, according to the control point offsets.

5. The method of claim 1, wherein the constructing the correlation weight matrix comprises:
   constructing a sensed lane line set according to the sensed lane lines related to the first difference matrix, the second difference matrix and the third difference matrix, and constructing a map lane line set according to the map lane lines related to the first difference matrix, the second difference matrix and the third difference matrix;

determining correlation weights between each sensed lane line in the sensed lane line set and each map lane line in the map lane line set, according to the first difference matrix, the second difference matrix and the third difference matrix; and constructing the correlation weight matrix for the first data and the second data, according to the correlation weights between each sensed lane line in the sensed lane line set and each map lane line in the map lane line set.

6. The method of claim 5, wherein the determining correlation weights comprises:

obtaining first differences between each sensed lane line in the sensed lane line set and each map lane line in the map lane line set from the first difference matrix, obtaining second differences between each sensed lane line in the sensed lane line set and each map lane line in the map lane line set from the second difference matrix, obtaining third differences between each sensed lane line in the sensed lane line set and each map lane line in the map lane line set from the third difference matrix;

normalizing the first differences, the second differences and the third differences; and determining the correlation weights between each sensed lane line and each map lane line according to:

$$\text{weight}_i = c_i * \Sigma_j (1-\text{error}_{i,j}),$$

wherein, $\text{weight}_i$ is a correlation weight of an i-th matched pair of the sensed lane lines and the map lane lines, $c_i$ is a correction coefficient determined according to a position of the sensed lane lines, $\text{error\_norm}_{i,j}$ is a normalized j-th difference of an i-th matched pair of the sensed lane lines and the map lane lines, i and j are natural numbers, $1 \le i \le m*n$, $1 \le j \le 3$, m is a number of sensed lane lines in the sensed lane line set, and n is a number of map lane lines in the map lane line set.

7. The method of claim 1, wherein the matching the first data with the second data comprises:

determining matched pairs having a highest correlation weight value for each of the sensed lane lines respectively from matched pairs related to said each of the sensed lane line, according to the correlation weight matrix;

setting the matched pairs having the highest correlation weight value for each of the sensed lane lines respectively as a match between the first data and the second data, in response to map lane lines related to the matched pairs having the highest correlation weight value being different from each other; and determining an optimal match between the sensed lane lines and the map lane lines for the correlation weight matrix based on a maximum matching set of a weighted bipartite graph, and setting the optimal match as the match between the first data and the second data, in response to same map lane lines existing in the matched pairs having the highest correlation weight value.

8. The method of claim 1, further comprising, before the constructing a correlation weight matrix:

comparing a distance between sensed boundary lines with a predetermined boundary distance, in response to determining that the obtained sensed lane lines include the sensed boundary lines;

modifying the sensed boundary lines to outermost sensed lane lines, in response to an absolute value of a difference between the distance between the sensed boundary lines and the predetermined boundary distance being smaller than or equal to a first threshold; and discarding the sensed boundary lines, in response to the absolute value of the difference between the distance between the sensed boundary lines and the predetermined boundary distance being greater than the first threshold.

9. The method of claim 8, further comprising, before the constructing a correlation weight matrix, selecting a set of sensed lane lines, according to horizontal intercepts of the sensed lane lines on a horizontal axis in a vehicle body coordinate system and yaw angles of the sensed lane lines relative to the horizontal axis in the vehicle body coordinate system, so as to obtain a candidate sensed lane line set.

10. The method of claim 9, wherein the constructing a correlation weight matrix comprises constructing the correlation weight matrix for the first data and the second data, based on differences between sensed lane lines included in the candidate sensed lane line set and the map lane lines.

11. An electronic device, comprising:

at least one processor; and a memory communicatively connected to the at least one processor, wherein the memory stores instructions executable by the at least one processor, and the instructions, when executed by the at least one processor, cause the at least one processor to at least:

obtain a first data indicating sensed lane lines and a second data indicating map lane lines respectively;

construct a correlation weight matrix for the first data and the second data, based on differences between the sensed lane lines and the map lane lines, the construction of the correlation weight matrix comprising:

determination, based on differences in horizontal intercept between the sensed lane lines and the map lane lines, of a first difference matrix, determination, based on differences in relative yaw angle between the sensed lane lines and the map lane lines, of a second difference matrix, determination, based on control point offsets between the sensed lane lines and the map lane lines, of a third difference matrix, and construction, according to the first difference matrix, the second difference matrix and the third difference matrix, of the correlation weight matrix for the first data and the second data; and match the first data with the second data according to the correlation weight matrix, so as to obtain a third data having an optimal match with the first data from the second data.

12. A non-transitory computer-readable storage medium having computer instructions therein, the computer instructions, when executed by a computer system, configured to cause the computer system to at least:

obtain a first data indicating sensed lane lines and a second data indicating map lane lines respectively;

construct a correlation weight matrix for the first data and the second data, based on differences between the sensed lane lines and the map lane lines, the construction of the correlation weight matrix comprising:

determination, based on differences in horizontal intercept between the sensed lane lines and the map lane lines, of a first difference matrix, determination, based on differences in relative yaw angle between the sensed lane lines and the map lane lines, of a second difference matrix, determination, based on control point offsets between the sensed lane lines and the map lane lines, of a third difference matrix, and construction, according to the first difference matrix, the second difference matrix and the third difference matrix, of the correlation weight matrix for the first data and the second data; and match the first data with the second data according to the correlation weight matrix, so as to obtain a third data having an optimal match with the first data from the second data.

13. The storage medium of claim 12, wherein the instructions configured to cause the computer system to determine a first difference matrix are further configured to cause the computer system to:

obtain a first intercept of each of the sensed lane lines on a horizontal axis in a vehicle body coordinate system;

obtain a second intercept of each of the map lane lines on the horizontal axis in the vehicle body coordinate system; and determine the first difference matrix, according to absolute values of differences between the first intercept of each sensed lane line and the second intercept of each map lane line.

14. The storage medium of claim 12, wherein the instructions configured to cause the computer system to determine a second difference matrix are further configured to cause the computer system to:

obtain a first yaw angle of each of the sensed lane lines relative to a horizontal axis in a vehicle body coordinate system;

obtain a second yaw angle of each of the map lane lines relative to the horizontal axis in the vehicle body coordinate system; and determine the second difference matrix, according to absolute values of differences between the first yaw angle of each sensed lane line and the second yaw angle of each map lane line.

15. The storage medium of claim 12, wherein the instructions configured to cause the computer system to determine a third difference matrix are further configured to cause the computer system to:

select at least one control point on each of the sensed lane lines;

determine distances from the control point on each of the sensed lane lines to each of the map lane lines, and setting the determined distances as control point offsets; and determine the third difference matrix, according to the control point offsets.

16. The storage medium of claim 12, wherein the instructions configured to cause the computer system to construct the correlation weight matrix are further configured to cause the computer system to:

construct a sensed lane line set according to the sensed lane lines related to the first difference matrix, the second difference matrix and the third difference matrix, and constructing a map lane line set according to the map lane lines related to the first difference matrix, the second difference matrix and the third difference matrix;

determine correlation weights between each sensed lane line in the sensed lane line set and each map lane line in the map lane line set, according to the first difference matrix, the second difference matrix and the third difference matrix; and construct the correlation weight matrix for the first data and the second data, according to the correlation weights between each sensed lane line in the sensed lane line set and each map lane line in the map lane line set.

17. The storage medium of claim 12, wherein the instructions configured to cause the computer system to match the first data with the second data are further configured to cause the computer system to:

determine matched pairs having a highest correlation weight value for each of the sensed lane lines respectively from matched pairs related to said each of the sensed lane line, according to the correlation weight matrix;

set the matched pairs having the highest correlation weight value for each of the sensed lane lines respectively as a match between the first data and the second data, in response to map lane lines related to the matched pairs having the highest correlation weight value being different from each other; and determine an optimal match between the sensed lane lines and the map lane lines for the correlation weight matrix based on a maximum matching set of a weighted bipartite graph, and set the optimal match as the match between the first data and the second data, in response to same map lane lines existing in the matched pairs having the highest correlation weight value.

18. The storage medium of claim 12, wherein the instructions are further configured to cause the computer system to, before the construction of a correlation weight matrix:

compare a distance between sensed boundary lines with a predetermined boundary distance, in response to determination that the obtained sensed lane lines include the sensed boundary lines;

modify the sensed boundary lines to outermost sensed lane lines, in response to an absolute value of a difference between the distance between the sensed boundary lines and the predetermined boundary distance being smaller than or equal to a first threshold; and discard the sensed boundary lines, in response to the absolute value of the difference between the distance between the sensed boundary lines and the predetermined boundary distance being greater than the first threshold.

19. The storage medium of claim 18, wherein the instructions are further configured to cause the computer system to, before the construction of a correlation weight matrix, select a set of sensed lane lines, according to horizontal intercepts of the sensed lane lines on a horizontal axis in a vehicle body coordinate system and yaw angles of the sensed lane lines relative to the horizontal axis in the vehicle body coordinate system, so as to obtain a candidate sensed lane line set.

20. The storage medium of claim 19, wherein the instructions configured to cause the computer system to construct a correlation weight matrix are further configured to cause the computer system to construct the correlation weight matrix for the first data and the second data, based on differences between sensed lane lines included in the candidate sensed lane line set and the map lane lines.

* * * * *